(12) United States Patent
Mousseau et al.

(10) Patent No.: US 6,477,529 B1
(45) Date of Patent: Nov. 5, 2002

(54) APPARATUS AND METHOD FOR DYNAMICALLY LIMITING INFORMATION SENT TO A VIEWING DEVICE

(75) Inventors: Gary Mousseau, Waterloo (CA); David Yach, Waterloo (CA); Herb A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 09/455,211

(22) Filed: Dec. 6, 1999

(51) Int. Cl.$^7$ .............................................. G06F 17/30
(52) U.S. Cl. ......................................................... 707/5
(58) Field of Search ................................. 707/2, 3, 4, 5, 707/10, 9, 101, 201, 503, 530; 709/203, 217, 219, 225, 226, 227, 229, 234, 247

(56) References Cited

U.S. PATENT DOCUMENTS

| | | | |
|---|---|---|---|
| 5,159,592 A | 10/1992 | Perkins | 370/401 |
| 5,327,426 A | 7/1994 | Dolin, Jr. et al. | 370/401 |
| 5,355,365 A | 10/1994 | Ehat et al. | 370/401 |
| 5,559,800 A | 9/1996 | Mousseau et al. | 370/401 |
| 6,314,425 B1 * | 11/2001 | Serbinis et al. | 707/10 |

FOREIGN PATENT DOCUMENTS

| | | |
|---|---|---|
| EP | 0 483 547 A1 | 5/1992 |
| WO | 93/15572 | 8/1993 |
| WO | 9919988 | 4/1999 |
| WO | 9948312 | 9/1999 |
| WO | 9950974 | 10/1999 |

OTHER PUBLICATIONS

Douglas E. Comer, "Internetworking with TCP/IP", 1991, pp. 44–49, 365–385, second edition, vol. I.
Sun Microsystem, User manual for Unix OS, Mar. 2, 1987, Section: Screen Command, pp. 1–12.
Fifth Nordic Seminar on Digital Mobile Radio Communications, Dec. 1992, Helsinki, Finland, pp. 389–395, XP458679, Chakraborty 'Data Interworking with GSM'.

* cited by examiner

*Primary Examiner*—Diane D. Mizrahi
*Assistant Examiner*—Apu M Mofiz
(74) *Attorney, Agent, or Firm*—Jones, Day, Reavis & Pogue; Krishna K. Pathiyal, Esq.; Charles B. Meyer, Esq.

(57) ABSTRACT

A system and method for transporting user-restricted data from a gateway device to a handheld viewing device is provided. The gateway device includes an information translator, content filters, and storage. The information translator delivers content from an information database coupled to the gateway to the handheld viewing device. A viewing component of the handheld device receives all possible data from the gateway device that the handheld device is capable of viewing. The user of the handheld device is then able to manually select certain portions of data through a user interface. Once the selection is complete, a series of comments are returned to the gateway device from the handheld device so that a subsequent viewing corresponds only to that information selected by the user.

33 Claims, 6 Drawing Sheets

APPARATUS AND METHOD FOR DYNAMICALLY LIMITING INFORMATION SENT TO A VIEWING DEVICE

BACKGROUND

1. Field of the Invention

The present invention relates to a system and method that provide remote control over information sent to a viewing device. The system and method provide control over the content or quantity of information sent to the viewing device. In particular, the information may be an Internet or Intranet world-wide web (WWW) page, with Hypertext Markup Language (HTML), Handheld Device Markup Language (HDML), Wireless Markup Language (WML), or Java content. The remote viewing device may be a handheld, laptop, or palmtop device with a limited viewing space for the information being received, and preferably connects to the Internet over a relatively low-bandwidth wireless radio network.

2. Description of the Related Art

Typically, handheld or palmtop devices have very limited viewing surfaces, limited memory available, slower processing speeds, and limited user inputs in comparison to large desktop computer systems. These devices may also communicate over a bandwidth-limited data network, such as a wireless packet data network, a cellular network using a digital packet data protocol, or they may use a limited speed modem to download at speeds between 9600 and 28K bits per second (bps). For these reasons it is desirable to limit the data these devices receive over the network or through the modem, particularly when receiving large data files, such as web pages that may include text, graphics, animations, multimedia files, or other interactive elements.

A known method for limiting data transfer to such a viewing device involves restricting the transmittal of graphic information. By providing a specific configuration setting available on most Internet browsers, a user can specify that only text information is fetched by the browser. The graphical portions of the web page are left behind. This method is indiscriminate, however, and leaves the user with little useful control; simply an on or off switch for changing the type of information viewed. In many cases there are pieces of text that are not desired in the information stream, and pieces of graphics that are desired in the information stream, but the user has no control over this situation.

A second known method, which is used more commonly in a wireless environment, involves new standards for controlling the content being delivered to the handheld viewing device. One such new standard is HDML, which was intended to replace the universally accepted HTML format for delivering content to handheld viewers. This approach has some industry backing, but fails to allow users access to all Internet and Intranet information.

Another known method for solving the wireless Internet content problem is to "spoof" the Inter-network Protocol (IP) and Transmission Control Protocol (TCP) so that they partially work over the wireless link. This "spoofing" method, however, often leads to a failure of both the protocols and the device to display all the information.

Alternatively, several attempts have been made at using a wireless proxy to eliminate using both TCP and IP over the wireless network. A wireless proxy is a computer that terminates a TCP/IP connection on one end and a wireless connection on the other end. The most common use of a proxy is as a TCP/IP "firewall," which is used in most companies' networks today. This proxy method removes the TCP/IP protocol from running over the wireless network, but leaves the actual data transferred untouched. This type of proxy has limited ability to further limit the higher-level information being sent to the user, and in particular the bandwidth heavy graphics and multimedia files embedded in most web pages.

Still another known method for limiting information sent to a portable viewing device is to have users pre-define the information sites they intend to access using their portable viewing device. In this method, a user must pick, ahead of time, every site to be accessed and must select the information to be transferred when connecting with the wireless viewer. This selection is typically done on a large desktop computer system, where visibility, memory, CPU speed and keyboard input are not restricted. The challenge for the user, however, is to have foreknowledge of every site to be accessed. This method thus falls short of offering the user a general-purpose browser for a wireless device, in which the user maintains dynamic control over what information is transmitted to the wireless devices.

SUMMARY OF THE INVENTION

A system and method for transporting user-restricted data from a gateway device to a handheld viewing device is provided. The gateway device includes an information translator, content filters and storage. The information translator delivers content to the gateway device from an information database coupled to the gateway via a network. A viewing component of the handheld device receives from the gateway device all possible data that the handheld device is capable of viewing. The user is able to manually select certain portions of data through a user interface in the handheld device, the selected portions corresponding to information that the user does not want to view during a subsequent retrieval of the same data. Once the selection is complete, a series of command instructions are returned to the gateway device from the handheld device so that a subsequent viewing corresponds only to that information that was not selected by the user. Alternatively, the user could select only that portion of data that the user wants to view during a subsequent download. In this latter situation, the command instruction transmitted to the gateway would instruct the gateway to filter all information except for the selected data.

The invention provides control over viewed content or information from any database. This control is based on commands stored in the gateway device. The commands limit the quantity of information sent to the handheld device. This functionality is accomplished by first establishing a set of information (or content) that is going to be restricted by the user. Then, the handheld device performs an editing function to restrict the information received. This editing process causes a set of commands to be passed back to the gateway device to restrict subsequent or future retrievals of the same information. The gateway device identifies the subsequent information request and performs the necessary filtering in order to restrict the information sent to the handheld device.

As will be appreciated, the invention is capable of other and different embodiments, and its several details are capable of modifications in various respects, all without departing from the spirit of the invention. Accordingly, the drawings and description of the preferred embodiment are to be regarded as illustrative in nature and not restrictive.

BRIEF DESCRIPTION OF THE DRAWINGS

The present invention will be apparent to those skilled in the art in view of the accompanying drawings, where.

DESCRIPTION OF A PREFERRED EMBODIMENT

Figure 1:
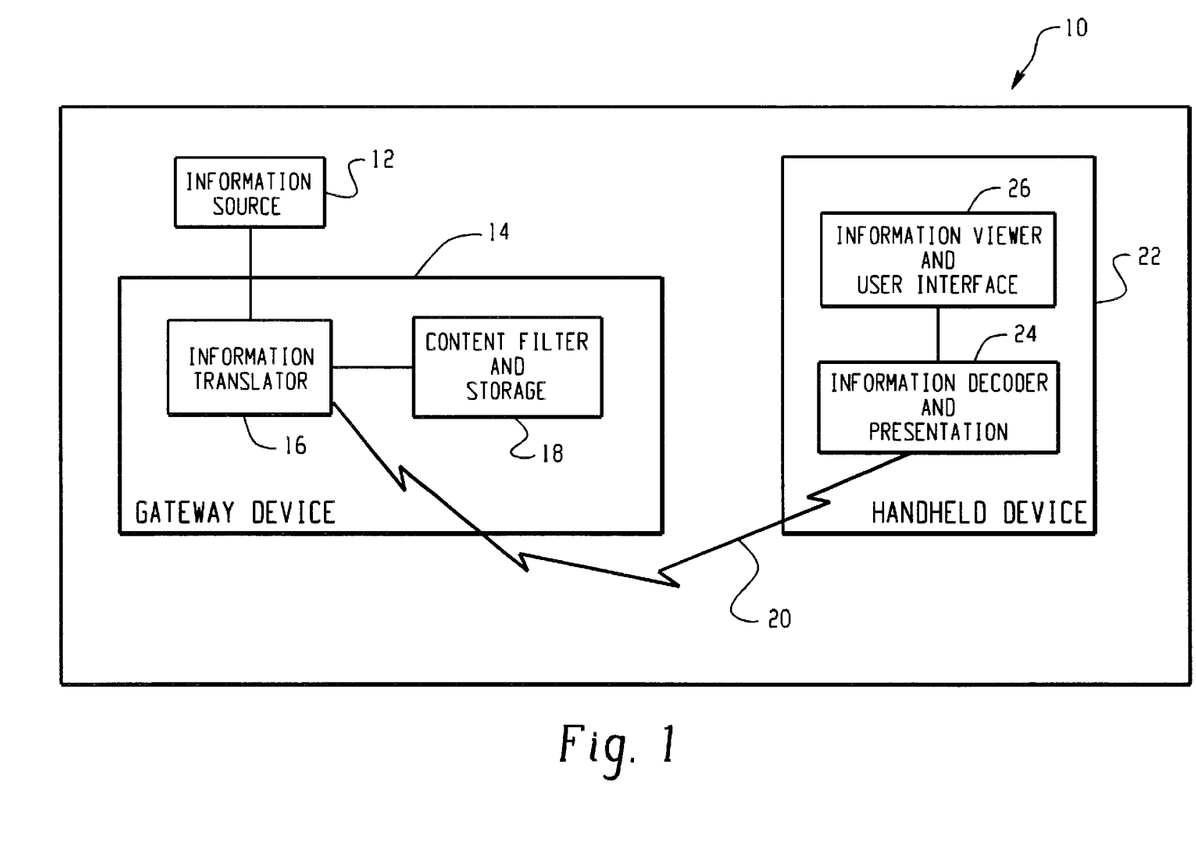
FIG. 1 is a block diagram of the components in the gateway and handheld device in a preferred embodiment of the present invention.

FIG. 1 shows a system 10 according to a first embodiment of the present invention. This system 10 includes a database or information source 12 coupled to a control device 14. The information source 12 could be an Internet site, an Intranet site, a database engine, or even a local system. The control device 14 in the preferred embodiment is a gateway host device. The gateway device 14 includes an information translator 16 and a content filter and storage area 18. A network connection 20 couples the gateway device 14 to a user interface and viewing device 22, preferably a wireless handheld viewing device. The handheld viewing device 22 includes an information decoder and presentation component 24, and an information viewer and user interface 26. The network 20 is preferably a wireless packet data network, such as Mobitex™ or DataTAC™, which has limited bandwidth capabilities, although it could be many other types of networks.

In a preferred embodiment, the handheld device is a BlackBerry™ or an Inter@ctive™ Pager manufactured by Research In Motion Limited. However, the present invention may be incorporated into other handheld devices or wireless transceivers, such as two-way paging computers, personal digital assistants ("PDAs"), portable electronic messaging devices, cellular phones, or handheld e-mail clients. Further, in the preferred embodiment, the gateway device 14 and handheld device 22 may be implemented utilizing either a software-programmable digital signal processor (DSP) or a programmable logic device.

In this system 10, the information source 12 is a repository of the information that the user of the handheld device desires to access for display. An information translator 16, such as a proxy server, is used as a gateway to accept a connection from the network 20, and in turn to make a connection to the information source 12 to retrieve the information desired. Preferably, the connection between the information translator 16 and the information source is a TCP/IP connection and the information source is a web server containing a plurality of web pages. As is known in the art, a proxy accepts a connection from a device and opens another connection on behalf of the device to allow the device to communicate with other devices or systems indirectly. To assist the information translator 16 in its task of getting information and preparing it for transmission to the handheld device 22, a content filter and storage area 18 is provided, which is coupled to the information translator 16. The content filter and storage area 18 can be located on the same machine as the information translator 16, in another location across a local area network (LAN), or even in a node cluster of fault tolerant storage device.

Communication across the network connection 20 is facilitated on the handheld device 22 by the information decoder and presentation device 24. This device 24 converts requests from the user into signals that are transmitted across the network connection 20 and understood by the gateway device 14. The information decoder component of the device 24 also uses a control channel to the gateway 14 for facilitating the exchange of special requests, such as the information restriction commands, as described in more detail below. The presentation component of the device 24 prepares the information for display to the user, and interprets special formatting commands within the data stream for the information viewer and user interface 26. The information viewer and user interface 26 is directly accessed by the user, and accepts keystrokes and screen movement commands during the information request phase and the information reception phase.

Figure 2:
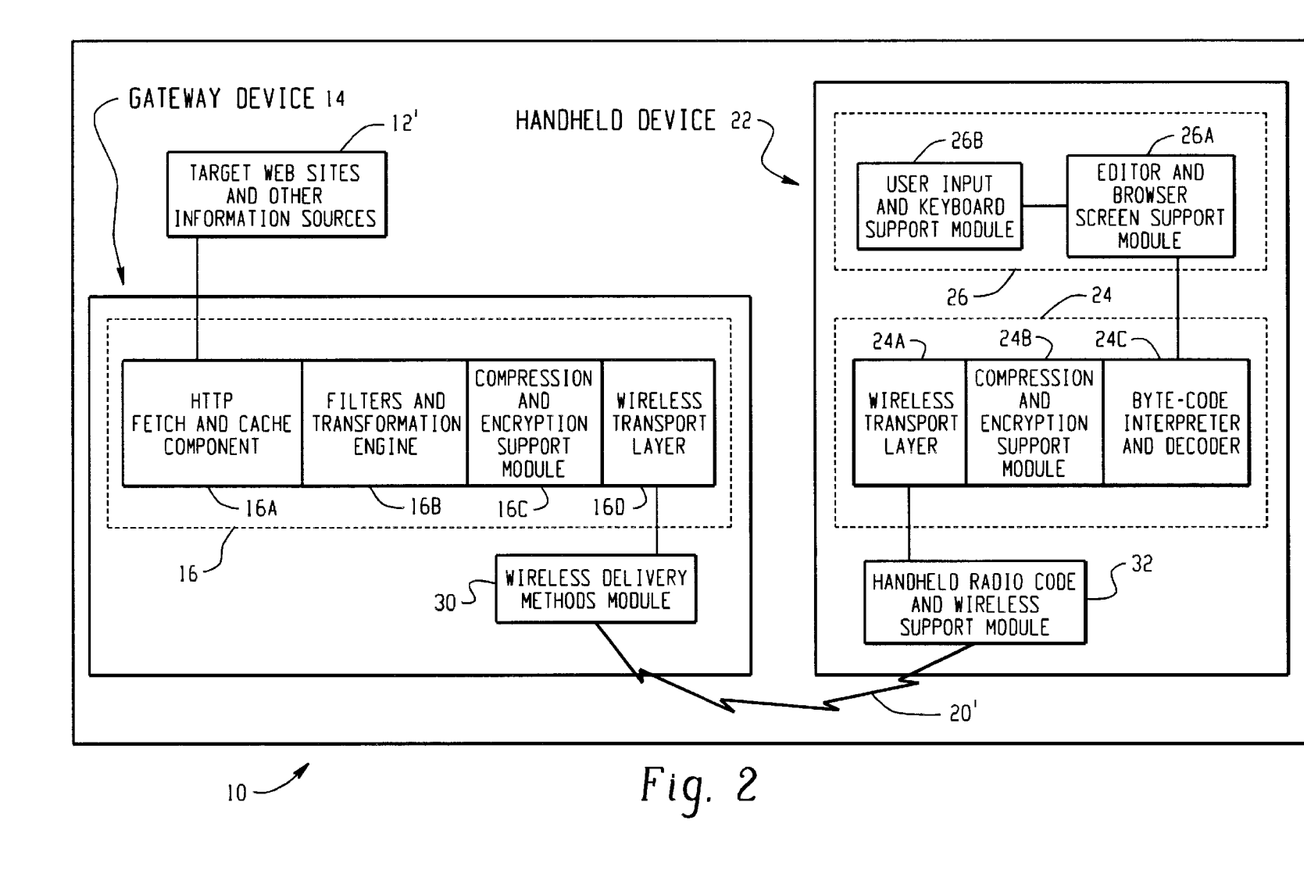
FIG. 2 is a more detailed block diagram of the components in the gateway and handheld device of FIG. 1.

A more detailed view of the gateway device 14 and handheld device 22 is shown in FIG. 2. The information translator 16 is coupled to, and communicates with the target web site and other information sources database 12' through a Hypertext Transfer Protocol (HTTP) fetch and cache component 16A. The target web sites and other information sources database 12' can be a range of computers, computer systems, and networks. For example, the information can be stored in local databases, on an Intranet, or on the Internet. The information translator 16 further includes a filter and transformation engine 16B, a compression and encryption support module 16C and a wireless transport layer 16D. If the information is not compressed and/or encrypted, then the compression and encryption support module 16C may be omitted. A wireless delivery methods module 30 is coupled to the wireless transport layer 16D.

As seen in FIG. 2, a wireless network 20' couples the wireless delivery methods module 30 in the gateway device 14 to a handheld radio code and wireless support module 32 in the handheld device 22. This handheld radio code and wireless support module 32 is coupled to the information decoder and presentation device 24 through a wireless transport layer 24A. The information decoder and presentation device 24 further includes a compression and encryption support module 24B and a byte-code interpreter and decoder 24C. If the information is not compressed and/or encrypted, then the compression and encryption support module 24B may be omitted. An editor and browser screen support module 26A in the information viewer and user interface 26 is coupled to the byte-code interpreter and decoder 24C. Additional components of the information viewer and user interface 26 include a user input and keyboard support module 26B.

The information translator 16 may include an HTTP fetch and cache component 16A, which is standard in the Internet industry. In other implementations, this machine 16 could include an Application Programming Interface (API) method for accessing local database files, directory LAN information and corporate data, or could include other methods of retrieving information. The filter and transformation engine 16B operatively performs a filtering process and information fetch and restrict method, described hereinafter with reference to FIGS. 3 and 5–6. This engine 16B allows the handheld device 22 to dynamically update a plurality of information filters to match the user's requirements for the transmitted information. The compression and encryption support module 16C is provided to allow for compression and encryption on the data before it is given to the wireless transport layer 16D. This compression and encryption support module 16C may optionally be omitted from the information translator 16. The wireless transport layer 16D is required to deliver the filtered (and compressed and/or encrypted) information to the user. The transport layer 16D also ensures that multiple packets are sent and received securely without damage or loss of the information.

The wireless delivery methods module 30 in the gateway device 14 and the corresponding handheld radio code and wireless support module 32 in the handheld device 22 (on either end of the wireless connection) provide the protocol information for the network packet formats and delivery methods of the particular wireless network 20'.

In the handheld device 22, the wireless transport layer 24A matches the wireless transport layer 16D on the gateway device 14. Both transport layers 24A and 16D must be present for end-to-end reliable delivery of information. When compression and encryption are used, the compression and encryption support module 24B in the handheld device 22 matches up with the gateway devices' compression and encryption support component 16C. The byte-code interpreter and decoder 24C operates to undo all the filtering and encoding preformed on the information by the gateway device 14. Once this component 24C has processed the information, the information can be passed up for display and user interaction in the information viewer and user interface 26.

When information arrives at the information viewer and user interface 26, it is received by the editor and browser screen support module 26A. The editor and browser screen support module 26A processes the information so that it is presentable to the user in a viewable and readable form. This component 26A includes a user interface API for screen manipulation, special formatting, highlighting, inverse video, and all other capabilities of the handheld device 22 that might be useful when displaying a large quantity of information in a readable form. The user input and keyboard support module 26B is provided for the user to input commands to manipulate the data or information.

Figure 3:
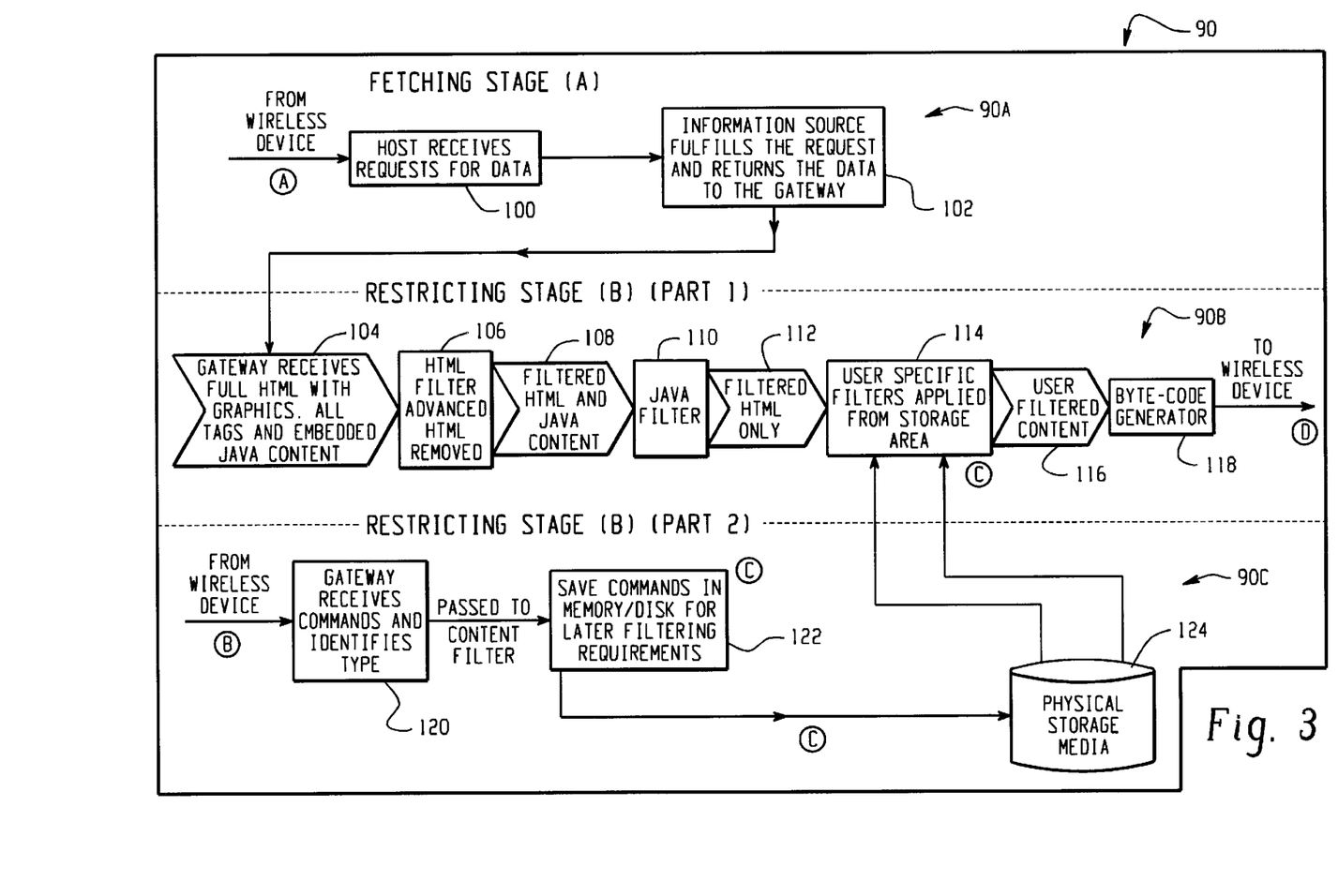
FIG. 3 is a flow diagram of a dynamic filtering process according to a preferred embodiment of the present invention.

Turning now to FIG. 3, a filter engine process 90 according to a preferred embodiment of the present invention is set forth. This process 90 includes a fetching stage 90A, and first and second parts of a restricting stage 90B and 90C, respectively. In this process 90, information requests (A) (see also step 306 in FIG. 5) flow into the gateway device 14 during the fetching stage 90A at step 100. At this stage 90A the gateway device 14 is simply acting as a traditional proxy machine and is taking the request and finding the correct information source 12 that can fulfill the request from step 100.

The requested information is received at the gateway 14 from the information source 12 and flows into the first part of the restricting stage 90B at step 104. In this part of the restricting stage 90B, the gateway device 14 performs general filtering, followed by a dynamic restriction step using the user's pre-established filters. As shown in step 104 there could be HTML content, Java content, pictures, graphics, animation and other data types received in the data stream from the information source 12. During this initial restricting stage 90B, advanced HTML commands are stripped at step 106 to form a data stream of filtered HTML and Java content 108. Then, at step 110, any Java commands are removed to form a data stream of filtered HTML information 112.

The restricting stage 90B further comprises the step of applying a user-specific filter 114 with filtering commands (C) (see also step 410 in FIG. 6) to further filter the data stream 112. In this step 114, the restricting stage 90B checks the filter storage area 124 for a user-defined filter to apply to the data stream 112. If such a user-defined filter is found, then it is applied to the filtered HTML-only data stream 112 to form a user-filtered content data stream 116. This data stream 116 is then sent to the byte-code converter at step 118 for translation into a format compatible with wireless delivery.

When a user receives a new piece of information and wants to limit what is viewed, the second part of restricting stage 90C occurs. Keeping in mind that no restricting of information is performed the first time that the data passes through the system, once the user performs the restricting steps (208–214 in FIG. 4, and 310–324 in FIG. 5) on the handheld device, restricting commands (B) are sent to the gateway device 14 for identification at step 120. The commands (C) (see also steps 426 and 428 in FIG. 6) to restrict or un-restrict content are provided to the file storage component 18 at step 122 for long-term storage on a disk and/or memory 124. These commands (C) are later retrieved during step 114 and applied in the first part of the restricting stage 90B, when the user subsequently requests this information.

Figure 4:
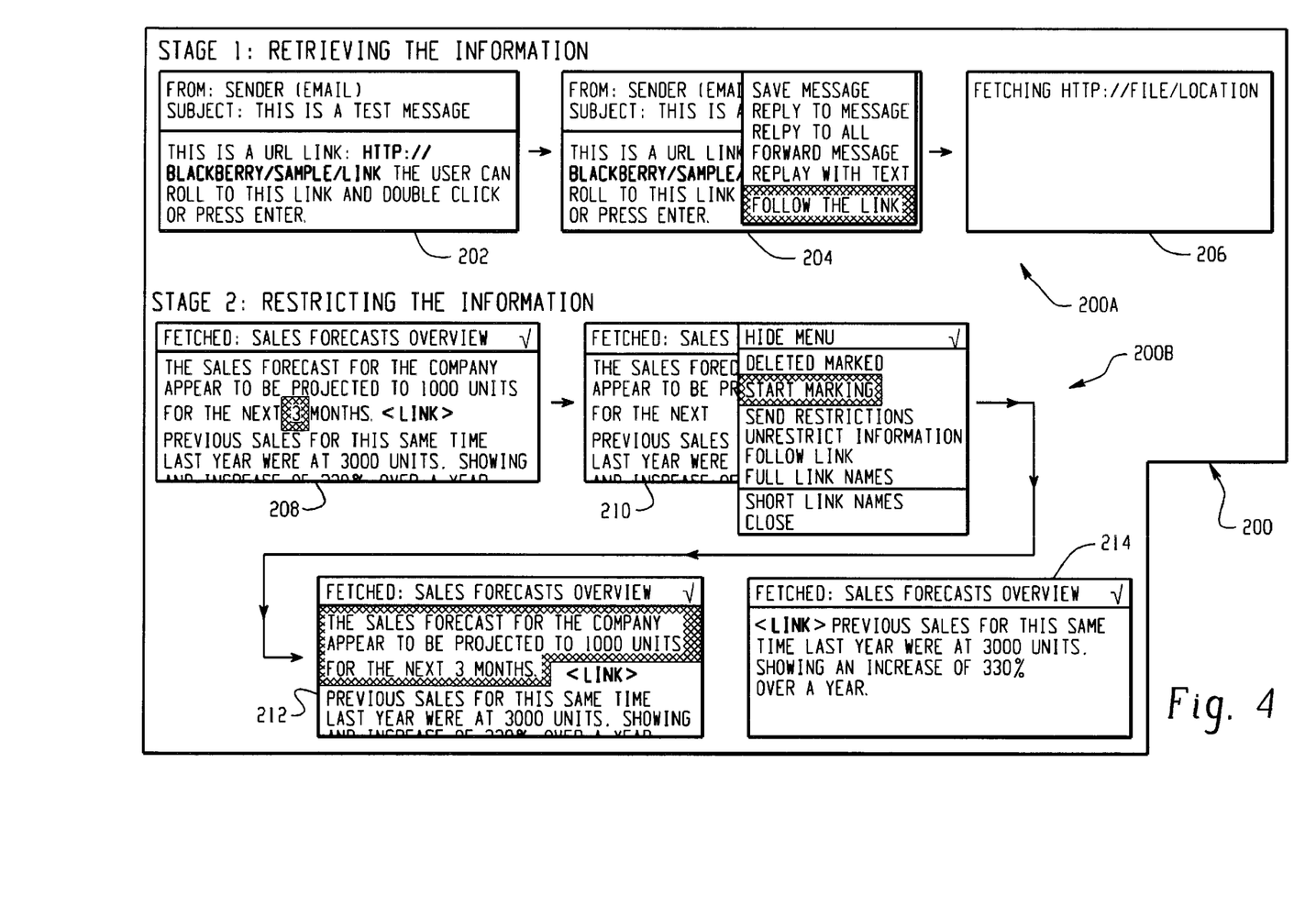
FIG. 4 shows a graphical user interface (GUI) display on the handheld device of FIG. 1 during a first and second stage of the restricting process according to a preferred embodiment of the present invention.

FIG. 4 shows the sequential graphical user interface (GUI) views during the process 90. There are two stages shown in FIG. 4, a first stage 200A in which the information is retrieved, and a second stage 200B, in which the information is restricted. During the first stage 200A, the information is retrieved by the user through the e-mail interface as shown in 202. In this screen, a link to the information is shown in bold within the context of other information. The user then selects to follow the link as shown in 204. This causes a request to be sent to the gateway device 14. The screen 206 is then displayed to indicate a request is pending, since it could take seconds or minutes to get the information over the network.

Once the information has been received, it is displayed in an information browser-like format 208. At any time the user can select the menu and pick the "Start Marking" menu item, as seen in 210, and begin the second stage 200B—the information restriction stage. During the restriction stage 200B, the user positions a moveable cursor across the information to be restricted, such as line of text, or a particular graphic, as seen in 212. As the cursor is dragged across the text, it changes the appearance of the information so that the user can visually identify the information selected for restriction. Once a delete key, or some other command key is pressed, the information is restricted from the current view, as seen in 214. The user then continues to scan the received data to determine whether other information should be similarly restricted. Once the user exits this screen 214, or selects a menu to close this screen, a series of restriction commands associated with the restricted information are sent to the gateway device 14. These restriction commands are used by the gateway to determine whether or not to subsequently send certain information elements of the requested information.

During the viewing of the screens 202–214 in FIG. 4, the basic e-mail presents the Universal Resource Locator (URL) link as bold faced characters, as seen in 202. When the cursor is positioned on any character of the URL link the enter key can be used as a hot key for jumping to the link. Otherwise, if the user presses a roller wheel (or some other selection mechanism) of the handheld device, while on any URL link, a new default item appears as seen in 204. In the case where the user is positioned on a URL link, the command "Follow the Link" is the default, as seen in 204. This is similar to attachment processing when the user is positioned on an attachment and the "Open Attachment" menu option is the default. To identify the URL link, the e-mail server scans all message bodies and looks for HTTP or WWW identifiers with other special characters such as "//", "/", and ".".

The fetching screen 206 appears when the interface is invoked from the message view, or when the user selects the "Follow the Link" menu option in 204. In this case the program has requested the URL and is waiting for it to be returned. If the user is fetching a random URL, then the program prompts for the URL name before issuing the fetch. Once information arrives into the browser, a notification tone is played following a user configured setting. This setting is different from the message list so the user can determine if e-mail or Internet traffic has arrived.

In a normal viewing mode of the message the user is simply moving the cursor across the displayed information as if viewing an e-mail message. Full link names are not shown, only small indicators to make the information more readable. Invoking the menu 210 provides the option of marking the information to be restricted in future fetches of the information. The user can also follow a link, if the cursor is on a link, or expand or shrink link names for readability.

When in the restricting stage 200B, the restricting commands used by the handheld device 22 to filter content use the original section identifier sent by the information translator 16. In the creation of the original text, each section of the HTML page, either each line or paragraph, is given a tag or a section identifier.

When the user is in the "marking mode" 212, the marked region jumps in sections boundaries, as defined by the original section identifiers sent by the information translator 16. In the marking mode, the user marks a section and presses the backspace key or 'ALT' Backspace key to remove the information. The user can also press the "Enter" key to delete the text or the backspace key since this is the default. After the user performs these operations on the sections to be deleted, including any links, the user can select the menu and pick the "Send Restrictions" menu item. This sends a command with the deleted "sections" to the information translator 16 for restriction the next time this information page is requested. At any time while viewing the information on the handheld device 22, the user can also select the "Unrestricted Information" menu item and remove any restriction commands that might exist on the information translator 16.

Figure 5:
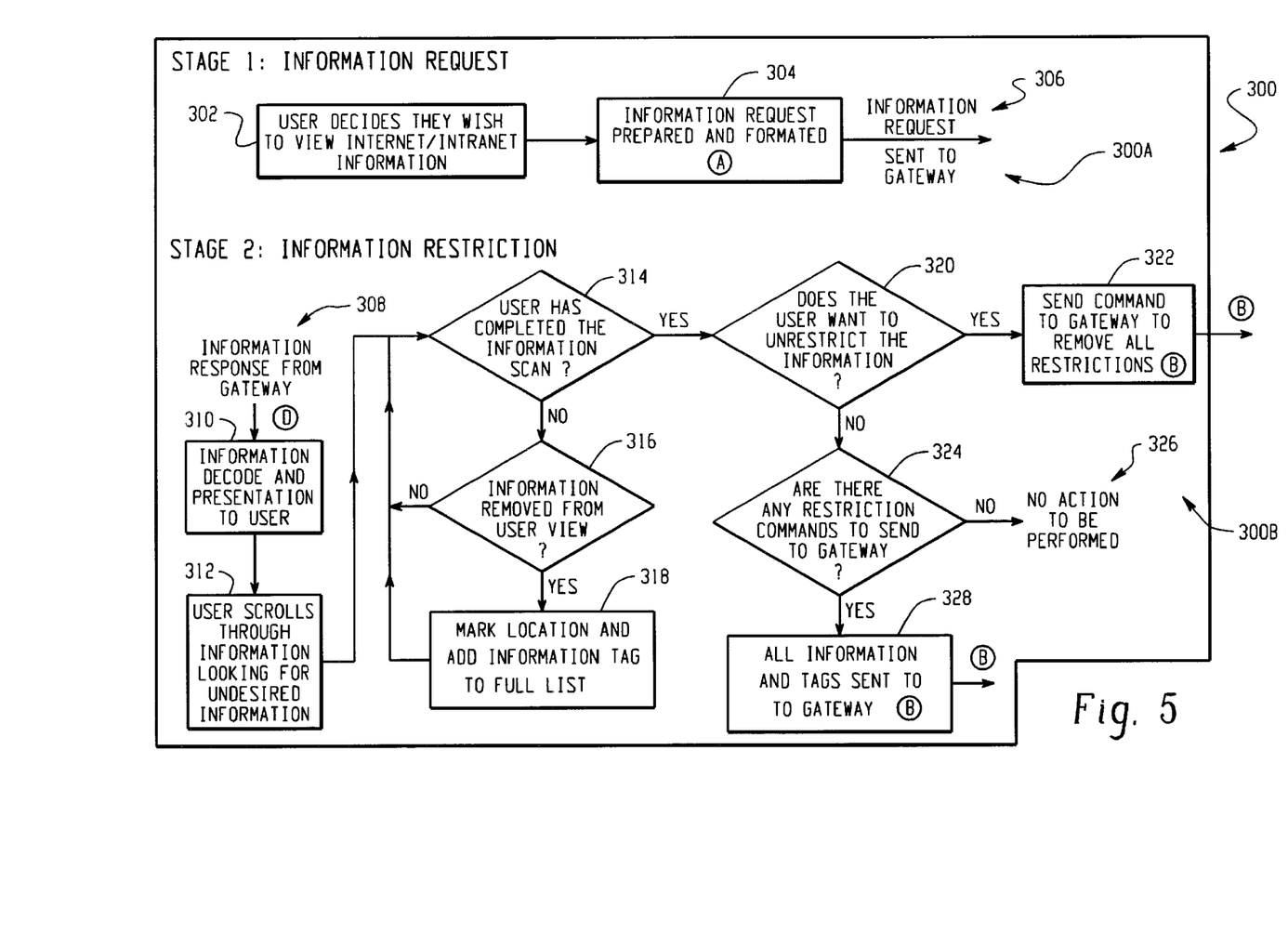
FIG. 5 is a flow diagram that illustrates the method performed by the handheld device according to a preferred embodiment of the present invention.

FIG. 5 shows the preferred method 300 under which the handheld device 22 operates to provide the user with the ability to restrict information received from the gateway 14. The method includes two stages: an information request stage 300A and an information restriction stage 300B. The user first decides whether or not to view information at step 302. In the preferred embodiment, this information is Internet-based or Intranet-based information. The user enters a request, preferably by entering a URL on the user input and keyboard support module 26B, which is provided to the information decoder 24C for preparation and formatting at step 304 to the gateway device 14. Once the formatting is complete, the request is transmitted to the gateway device 14 at step 306 via the network connection 20/20'.

Some time later, the gateway device 14 transmits the information at step 308 to the handheld device 22. The information is decoded and presented to the user at step 310 by the information decoder and presentation component 24. By using the user interface 26, the user preferably scrolls through the information searching for undesired sections at step 312. The user can enter a scanning termination sequence at step 314, which is either exiting the information screen or a menu choice. While viewing the information, the user can remove information from the screen at step 316 using deletion commands provided by the user interface and keyboard 26. Each time a section of data is selected it is tagged and labeled as having been removed at step 318. A corresponding restriction command will subsequently be sent to the gateway device 14 (step 324) so that the tagged information will be automatically removed from the same information if a subsequent request occurs.

Once the user has completed an information scan and restriction in steps 314–318, the system then determines whether the user wants to "un-restrict" some range of information that was previously restricted at step 320. If so, then the information decoder 24 prepares the correct command sequence and sends it to the gateway device 14 at step 322 for execution. Otherwise, the user interface 26 determines if there are any restricting commands present at step 324. If so, then the commands are prepared and sent to the gateway device 14 at step 328. If not, then no action is performed and hence no actions are sent to the gateway device 14 at step 326.

Figure 6:
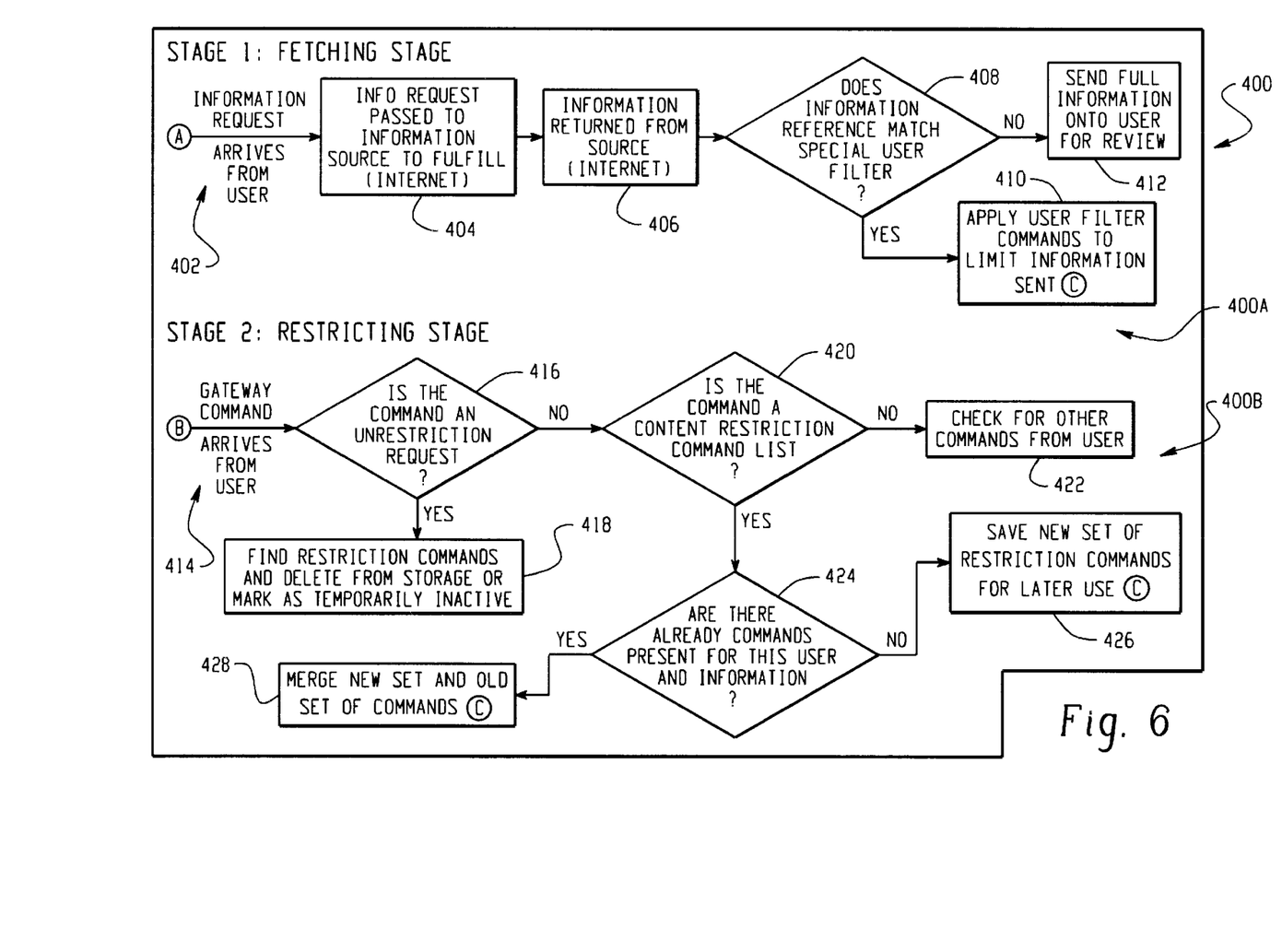
FIG. 6 is a flow diagram that illustrates the method performed by the gateway device according to a preferred embodiment of the present invention.

FIG. 6 shows a preferred method 400 of operation that the gateway device 14 performs to enable the user to dynamically restrict information sent to the handheld device 22. The method 400 includes two stages: a fetching stage 400A and a restricting stage 400B. As originally described in FIG. 3, and shown again in FIG. 5, information requests arrive from the user at step 402 and are given to the gateway device 14 for processing. Information requests are prepared and given to the information source at step 404. In the preferred embodiment, this source is typically a web site and the TCP/IP protocol is used to transport the information.

After this request for information, the information source 12/12' returns the information at step 406 over the Internet or Intranet to the gateway device 14 that requested the information on behalf of the user of the handheld device 22. Once the information has been received, the gateway device 14 checks to see if there is a user filter that matches the handheld device 22 and information reference number URL at step 408. If a match is found, then the user filter commands are applied to the information at step 410, which results in portions of the information being deleted from the data stream. This information is then sent to the handheld device 22 at step 410, with the selected information removed. If there are no user filters that match the information being given to this user, the information is sent along as is to the handheld device 22 at step 412. As shown in FIG. 3, other automatic filtering operations can also be performed on the information to remove bandwidth-intensive elements, such as graphics and animations.

Step 414 in FIG. 6 sets forth the beginning of the restricting stage 400B, in which the gateway 14 receives commands from the user that are used to affect user filters. The first check in the gateway device 14 is to determine if the command is for an unrestriction request at step 416. If so, then the restriction commands are found and deleted from storage 18/124 or marked as temporarily inactive at step 418. If not, then the system checks to see if the command is a content restriction command list at step 420. If it is not, then the system checks to see if the command is some other command at step 422. If the command is a new content restriction command list at step 420, then the gateway device 14 checks to see if there is already a stored set of restriction commands for this same information page at step 424. If there is not, then the command information is saved at step 426 in the information storage area 18/124 for later retrieval when the user requests the same information page. Otherwise, a merge of the previous commands and the new commands is performed at step 428, and the resulting merged set of restriction commands are saved in the storage area 18/124 for later retrieval when the user requests the same information page.

The invention has been described with reference to preferred embodiments. Those skilled in the art will perceive improvements, changes, and modifications. Such improvements, changes and modifications are intended to be covered by the appended claims.

We claim:

1. A method of controlling viewed information in a document retrieved from a database based on commands stored in a gateway device to limit the quantity of information sent to a handheld device comprising the steps of:

receiving the document from the database with the handheld device;

establishing information in the document to be restricted by a user;

using a special editing command with the handheld device to select the information in the document to be restricted by the user;

passing a set of commands to the gateway device to restrict subsequent retrievals of the document from the database by the handheld device;

identifying a subsequent retrieval of the document from the database by the handheld device using the gateway device; and performing filtering during the subsequent retrieval of the document in order to remove the restricted information from the document.

2. The method of claim 1, wherein the database is a world-wide-web (WWW) server and the document is a web page.

3. A system for limiting data transmitted to a wireless handheld viewing device from a gateway device comprising:

means for delivering data in a document from an information database coupled to the gateway device to the wireless handheld viewing device;

means for receiving all possible data in the document from the gateway device that the wireless handheld viewing device is capable of displaying;

means for manually selecting exact portions of data in the document that are of importance through a user interface in the wireless handheld viewing device, the means for selecting being configured such that once the selection is complete a series of instructions are returned to the gateway device from the wireless handheld viewing device so that during a subsequent viewing the selected portions of data are removed from the document.

4. The system of claim 3, wherein the information database is a world-wide-web (WWW) server and the document is a web page.

5. A system comprising:

a document server;

a handheld device configured to receive a document transmitted from the document server, the handheld device being further configured to edit selected portions of the document in response to user input, and to generate control signals indicative of the user input; and a gateway device configured to respond to the control signals by controlling a flow of information transmitted from the document server to the handheld device in accordance with the control signals;

wherein the gateway device is configured to dynamically restrict the flow of information transmitted from the document server such that user selected portions of the document are removed in subsequent transmissions of the document from the document server to the handheld device.

6. The system of claim 5, wherein the gateway device comprises;

an information translator coupled between the document server and the handheld device; and a filter and memory coupled to the information translator.

7. The system of claim 6, wherein the information translator comprises:

a Hypertext Transfer Protocol (HTTP) fetch and cache coupled to the source of information;

a filter and transformation engine coupled to the HTTP fetch and cache; and a wireless transport layer coupled between the filter and transformation engine and the handheld device.

8. The system of claim 7, wherein the information translator further comprises a compression and encryption support module coupled between the filter and transformation engine and the wireless transport layer.

9. The system of claim 6, wherein the gateway device further comprises a wireless delivery methods component coupled between the information translator and the handheld device.

10. The system of claim 5, wherein the handheld device comprises:

an information decoder and presentation component coupled to the gateway device; and an information viewer and user interface coupled to the information decoder and presentation component.

11. The system of claim 10, wherein the information decoder and presentation component comprises:

a wireless transport layer coupled to the gateway device; and a byte-code interpreter and decoder coupled between the wireless transport layer and the information viewer and user interface.

12. The system of claim 11, wherein the information decoder and presentation component further comprises a compression and encryption support module coupled between the wireless transport layer and the byte-code interpreter and decoder.

13. The system of claim 10, wherein the information viewer and user interface comprises:

an editor and browser screen support module coupled to the information decoder and presentation component; and a user input and keyboard support module coupled to the editor and browser screen support module.

14. The system of claim 10, wherein the handheld device further comprises a handheld radio code and wireless support module coupled between the information decoder and presentation component and the gateway device.

15. The system of claim 5, wherein the document server is an Internet server.

16. The system of claim 5, wherein the document server is an Intranet server.

17. The system of claim 5, wherein the document server is a world-wide-web (WWW) server and the document is a web page.

18. A system for dynamically filtering user-defined sections of data, comprising:
   a database configured to store documents;
   a control device configured to perform dynamic filtering of a user defined section of a document received from the database; and
   a user interface and viewing device remotely coupled to the control device, the user interface and viewing device being configured to convert user input based on selected portions of the document to filter signals and to transmit the filter signals to the control device so that the control device subsequently filters the document according to the filter signals and the interface and viewing device subsequently displays the filtered data.

19. The system of claim 18, wherein the document server stores textual and graphical data, and wherein the control device is configured to use the filter signals to dynamically filter user defined sections of the textual and graphical data.

20. The system of claim 19, wherein:
   the control device is a gateway device;
   the user interface and viewing device is a wireless handheld viewing device; and
   the document is an Internet web page.

21. The system of claim 18, wherein the database is a world-wide-web (WWW) server and the document is a web page.

22. A method, comprising the steps of:
   requesting a document through a wireless device coupled to a host device;
   receiving the requested document at the host device from a document server;
   filtering the received document using a predetermined set of filters;
   filtering the received document using a dynamic filter based on user-defined criteria transmitted to the host device from the wireless device;
   transmitting the filtered document from the host device to the wireless device;
   displaying the filtered document on the wireless device;
   storing user input based on the displayed document;
   converting the stored user input into the user-defined filter criteria;
   transmitting the user-defined filter criteria to the host device; and
   storing the user-defined criteria at the host device to define the dynamic filter;
   wherein the user-defined criteria is based on a selected portion of the document and wherein subsequent requests for the document through the wireless device are filtered to remove the selected portion of the document.

23. The method of claim 22, wherein the document server is a world-wide-web (WWW) server and the document is a web page.

24. A method, comprising the steps of:
   fetching a document from a document server;
   restricting the fetched document using fixed criteria;
   restricting the fetched document using dynamic user defined criteria;
   transmitting the restricted document to a viewing device;
   receiving user input based on the restricted document; and
   converting the user input into the user defined criteria;
   wherein the user defined criteria is based on a selected portion of the document.

25. The method of claim 24, wherein the step of restricting the fetched information using dynamic user defined criteria comprises the steps of:
   receiving commands from a user via a user interface;
   determining if the command is an unrestricted request;
   if the command is an unrestricted request, then deleting or marking as temporarily inactive all previous restriction commands relating to desired information; and
   if the command is not an unrestricted request, then determining if the command is another predetermined type of command.

26. The method of claim 25, wherein, if the command is not an unrestricted request, then performing the steps of:
   determining whether the predetermined type of command is a content restriction command list;
   if the predetermined type of command is a content restriction command list, then checking for previously stored commands present for the user and the desired information; and
   if the predetermined type of command is not a content restriction command list, then checking for other commands from the user.

27. The method of claim 24, wherein the document server is a world-wide-web (WWW) server and the document is a web page.

28. A system for controlling the transmission of information to a wireless device, comprising:
   a world-wide web (WWW) server with a plurality of web pages; and
   a gateway device configured to receive an information request from the wireless device identifying the WWW server and to establish a connection to the WWW server over a computer network, wherein the gateway device comprises:
      a fetch and cache component that retrieves and stores information from a web page on the WWW server;
      a restricting stage that removes at least one predetermined data type from the information retrieved from the web page to generate a filtered output;
      means for transmitting the filtered output to the wireless device;
      an additional restricting stage that receives a filtering command from the wireless device and that uses the filtering command to remove additional data from the information retrieved from the web page and generate the filtered output; and
      wherein the filtering command is generated by the wireless device in response to user input made by selecting a portion of the web page to be removed in subsequent transmissions from the gateway device.

29. The system of claim 28, wherein the gateway device further comprises:
   a compression and encryption module that compresses and encrypts the filtered output prior to transmission to the wireless device.

30. The system of claim 28, wherein the pre-determined data type is advanced HTML commands.

31. The system of claim 28, wherein the pre-determined data type is Java content.

32. The system of claim 28, wherein the transmitting means includes a wireless transport layer.

33. The system of claim 28, wherein the transmitting means includes a wireless delivery module that adds protocol information for delivery over a wireless network.

* * * * *